United States Patent
Kshirsagar et al.

(10) Patent No.: US 9,890,811 B2
(45) Date of Patent: Feb. 13, 2018

(54) MULTIPLE-AXIS MAGNETIC BEARING AND CONTROL OF THE MAGNETIC BEARING WITH ACTIVE SWITCH TOPOLOGIES

(71) Applicant: Carrier Corporation, Farmington, CT (US)

(72) Inventors: Parag Kshirsagar, Vernon, CT (US); Peng Yan, Eagan, MN (US)

(73) Assignee: CARRIER CORPORATION, Farmington, CT (US)

( * ) Notice: Subject to any disclaimer, the term of this patent is extended or adjusted under 35 U.S.C. 154(b) by 95 days.

(21) Appl. No.: 14/390,197

(22) PCT Filed: Apr. 3, 2013

(86) PCT No.: PCT/US2013/035052
§ 371 (c)(1),
(2) Date: Oct. 2, 2014

(87) PCT Pub. No.: WO2013/152061
PCT Pub. Date: Oct. 10, 2013

(65) Prior Publication Data
US 2015/0068243 A1    Mar. 12, 2015

Related U.S. Application Data

(60) Provisional application No. 61/620,098, filed on Apr. 4, 2012.

(51) Int. Cl.
*F04D 29/058*    (2006.01)
*F16C 32/04*    (2006.01)
(Continued)

(52) U.S. Cl.
CPC ........ *F16C 32/0489* (2013.01); *F04D 29/058* (2013.01); *F16C 32/0444* (2013.01);
(Continued)

(58) Field of Classification Search
CPC ............................. G05B 15/02; G05B 13/048
(Continued)

(56) References Cited

U.S. PATENT DOCUMENTS 3,937,533 A    2/1976    Veillette
5,027,048 A *  6/1991   Masrur .................. B60G 13/14
                                                               177/184

(Continued)

FOREIGN PATENT DOCUMENTS

EP    0836022 A1    4/1998
EP    1460294 A2    9/2004
(Continued)

OTHER PUBLICATIONS

International Search Report for application PCT/US2013/035052, dated Mar. 17, 2014, 6 pages.
(Continued)

*Primary Examiner* — Eduardo Colon Santana
*Assistant Examiner* — Devon Joseph
(74) *Attorney, Agent, or Firm* — Cantor Colburn LLP

(57) ABSTRACT

A magnetic bearing system (120) includes a first active magnetic bearing (AMB) (202) including a first group of electromagnetic actuators (306, 310, 314, 318) to support a shaft and a second AMB (204) including a second group of electromagnetic actuators (308, 312, 316, 320) to support the shaft. A controller for the two AMB's includes a multiphase topology (400) with a plurality of active current switches for controlling the electromagnetic actuators (306-320) of each of the first AMB (202) and the second AMB (204). Each electromagnetic actuator (306, 310, 314, 318) of the first AMB (202) is electrically coupled to an electromagnetic actuator (308, 312, 316, 320) of the second AMB (204). Each pair of coupled electromagnetic actuators (306, 316) is respectively connected to three phase legs (418, 420,
(Continued)

422) of the topology (400) of the controller, whereby one end (X2+, X3−) of each of the electromagnetic actuators of a pair (306, 316) is connected to one phase leg (420) of the topology (400) and the other ends (X1+, X4−) are respectively connected to two further phase legs (418, 422) of the topology (400). The controller is operable to receive information indicative of a position of the rotor shaft and supply an adjustment signal to the magnetic bearing system (120) to adjust the position of the shaft.

27 Claims, 5 Drawing Sheets

(51) Int. Cl.
  *F25B 31/02* (2006.01)
  *F25B 1/00* (2006.01)
(52) U.S. Cl.
  CPC ...... *F16C 32/0457* (2013.01); *F16C 32/0487* (2013.01); *F25B 1/005* (2013.01); *F25B 31/026* (2013.01); *F16C 32/0451* (2013.01); *F16C 2362/52* (2013.01)
(58) Field of Classification Search
  USPC .......................................................... 318/4
  See application file for complete search history.

(56) References Cited

U.S. PATENT DOCUMENTS

| | | | | |
|---|---|---|---|---|
| 5,060,959 A * | 10/1991 | Davis | ............... | B60G 13/14 267/64.24 |
| 5,072,141 A | 12/1991 | Eisenbart et al. | | |
| 5,095,221 A * | 3/1992 | Tyler | ............... | F02C 9/28 290/1 R |
| 5,103,629 A * | 4/1992 | Mumford | ............... | F02C 7/26 60/778 |
| 5,237,229 A * | 8/1993 | Ohishi | ............... | F16C 32/0497 310/156.12 |
| 5,252,860 A * | 10/1993 | McCarty | ............... | F02C 9/28 290/40 R |
| 5,736,800 A | 4/1998 | Iannello et al. | | |
| 5,752,774 A * | 5/1998 | Heshmat | ............... | F16C 32/0442 384/549 |
| 5,844,339 A | 12/1998 | Schroeder et al. | | |
| 5,924,847 A * | 7/1999 | Scaringe | ............... | F04D 25/06 417/42 |
| 5,925,957 A * | 7/1999 | Chapman | ............... | F16C 32/0442 310/51 |
| 6,218,751 B1 * | 4/2001 | Bohlin | ............... | F16C 32/0417 310/90.5 |
| 6,297,574 B1 * | 10/2001 | Schob | ............... | F16C 32/0453 310/168 |
| 6,353,273 B1 * | 3/2002 | Heshmat | ............... | F16C 17/024 310/90.5 |
| 6,359,356 B1 | 3/2002 | Hayashi | | |
| 6,365,996 B2 * | 4/2002 | Schob | ............... | F16C 32/0463 310/90.5 |
| 6,770,993 B1 * | 8/2004 | Heshmat | ............... | F16C 17/024 310/90.5 |
| 6,921,997 B2 | 7/2005 | Chen et al. | | |
| 6,965,181 B1 * | 11/2005 | Heshmat | ............... | F16C 17/024 310/90.5 |
| 7,325,401 B1 * | 2/2008 | Kesseli | ............... | F01D 17/143 60/677 |
| 7,594,414 B2 * | 9/2009 | Wilding | ............... | F25J 1/0262 62/611 |
| 7,825,558 B2 * | 11/2010 | Jungmayr | ............... | F04D 29/058 310/268 |
| 7,884,521 B2 * | 2/2011 | Buhler | ............... | F16C 3/02 310/216.121 |
| 7,932,655 B2 | 4/2011 | Buhler et al. | | |
| 8,015,812 B1 * | 9/2011 | Kesseli | ............... | F01D 17/143 60/612 |
| 8,018,106 B2 | 9/2011 | Buhler | | |
| 8,466,591 B2 * | 6/2013 | Grimseth | ............... | F16C 32/00 310/90 |
| 8,801,361 B2 * | 8/2014 | Hawkins | ............... | F04D 27/001 415/1 |
| 9,293,971 B2 * | 3/2016 | Benbouzid | ............... | H02P 31/00 |
| 2004/0150278 A1 * | 8/2004 | Okada | ............... | F16C 32/0444 310/90.5 |
| 2006/0213223 A1 * | 9/2006 | Wilding | ............... | F25J 1/0262 62/613 |
| 2007/0164627 A1 * | 7/2007 | Brunet | ............... | F16C 32/0459 310/90.5 |
| 2008/0265704 A1 * | 10/2008 | Buhler | ............... | F16C 32/0457 310/90.5 |
| 2009/0302699 A1 | 12/2009 | Denk et al. | | |
| 2010/0013332 A1 * | 1/2010 | Vollmer | ............... | F16C 32/0463 310/90.5 |
| 2010/0181855 A1 * | 7/2010 | Denk | ............... | F16C 32/0457 310/90.5 |
| 2010/0194225 A1 | 8/2010 | Allaire et al. | | |
| 2011/0057528 A1 * | 3/2011 | Grimseth | ............... | F16C 32/00 310/90.5 |
| 2013/0039740 A1 * | 2/2013 | Hawkins | ............... | F04D 27/001 415/15 |
| 2013/0201316 A1 * | 8/2013 | Binder | ............... | H04L 67/12 348/77 |
| 2014/0077645 A1 * | 3/2014 | De Lepine | ............... | H02K 7/09 310/90.5 |
| 2014/0113828 A1 * | 4/2014 | Gilbert | ............... | H01L 39/126 505/100 |
| 2014/0117801 A1 * | 5/2014 | Permuy | ............... | F16C 32/048 310/90.5 |
| 2014/0303779 A1 * | 10/2014 | Zhu | ............... | G05B 15/02 700/275 |
| 2014/0303780 A1 * | 10/2014 | Zhu | ............... | G05B 15/02 700/275 |
| 2015/0002000 A1 * | 1/2015 | Benbouzid | ............... | H02P 31/00 310/68 B |
| 2015/0068243 A1 * | 3/2015 | Kshirsagar | ............... | F16C 32/0457 62/498 |

FOREIGN PATENT DOCUMENTS

| | | |
|---|---|---|
| EP | 1605177 A1 | 12/2005 |
| EP | 1719960 A1 | 11/2006 |
| EP | 2148104 A1 | 1/2010 |
| JP | 2000002469 A | 1/2000 |

OTHER PUBLICATIONS

Written Opinion for application PCT/US2013/035052, dated Mar. 17, 2014, 5 pages.

* cited by examiner

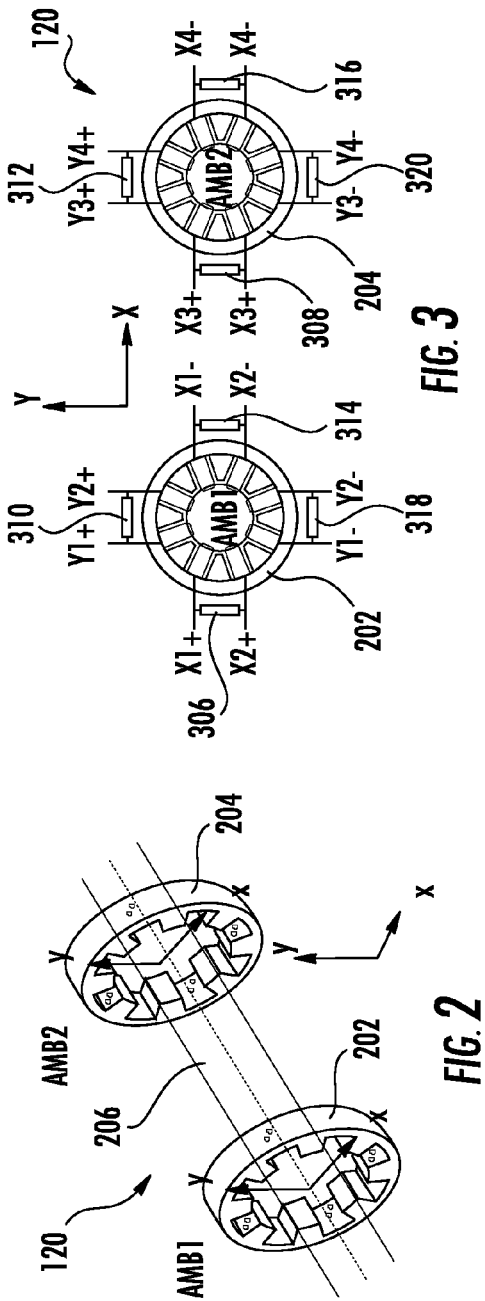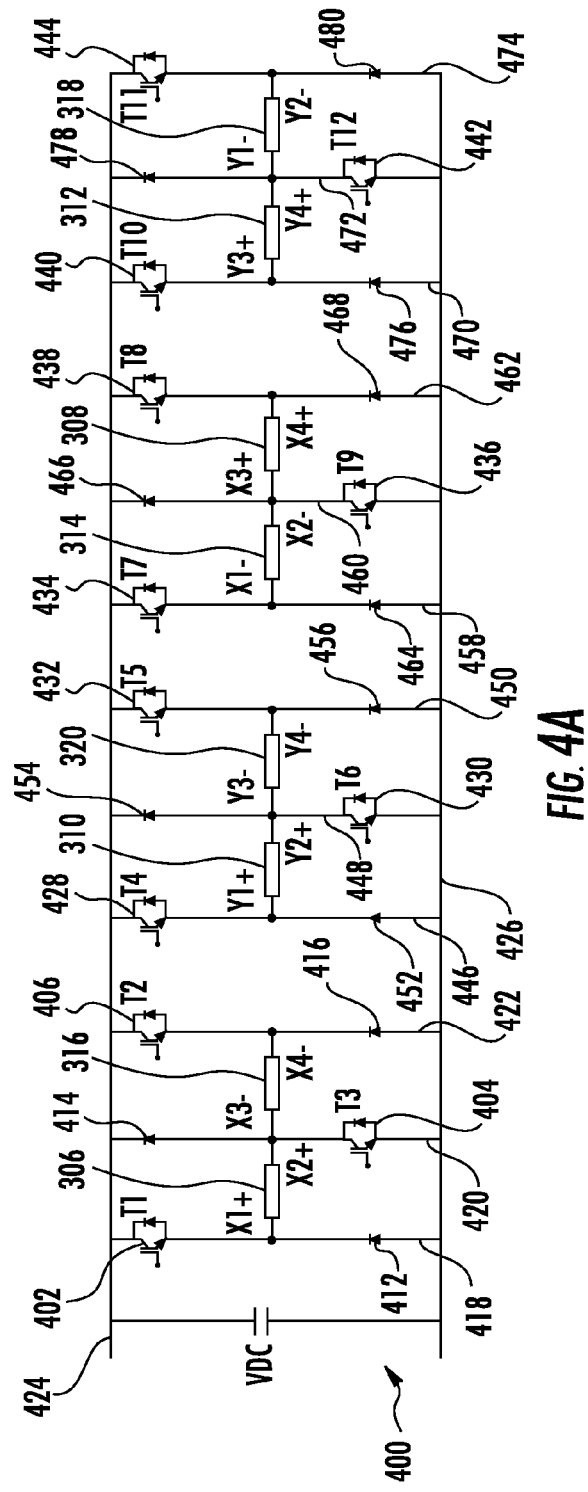

MULTIPLE-AXIS MAGNETIC BEARING AND CONTROL OF THE MAGNETIC BEARING WITH ACTIVE SWITCH TOPOLOGIES

FIELD OF INVENTION

Embodiments relate generally to refrigerant vapor compression systems for residential or light commercial heating and refrigeration applications and, more particularly, to one or more multiple-axis active magnetic bearings (AMB) and control of the AMBs that are connected to a rotor shaft of the refrigerant vapor compression system.

DESCRIPTION OF RELATED ART

Traditional centrifugal compressors in the heating ventilation and air conditioning (HVAC) industry use roller bearings and hydrodynamic bearings, both of which consume power, require oil, and a lubrication system. Ceramic roller bearings, which avoid issues related to oil and power consumption, have been introduced in these HVAC applications. Ceramic roller bearings are not suitable for compressor speeds above 30,000 revolutions per minute (rpm), as these bearings generate excessive heat at high rpms. Gears operate at high rpms and are typically used in lieu of ceramic roller bearings. While gears are a proven technology, they require more lubrication, create excessive noise and vibration, and consume more power.

AMBs have been used more widely in industrial applications as a replacement for conventional lubricated bearings. These industrial applications of the AMB enable machines to spin at very high speeds due to minimal friction. However, the high costs of these AMBs including their controls have limited the wide scale implementation of magnetic bearings, particularly within the HVAC industry. Typically, power amplifiers with varying topologies are utilized to provide energizing currents for controlling the AMBs. But, as more coils are used in these AMBs, additional power amplifiers and associated driver and sensor circuits are required to implement the control algorithms. The additional power amplifiers make implementing the AMB topology more expensive and complex. An improved topology with a reduced number of switches for controlling the AMB would be well received in the art.

BRIEF SUMMARY

According to one aspect of the invention, a refrigerant vapor compression system including a condenser, an expansion valve, an evaporator, and a compressor coupled to a multiple-axis magnetic bearing system, includes a motor operatively coupled to the compressor via a rotor shaft; the multiple-axis magnetic bearing system including a first active magnetic bearing (AMB) having a first group of electromagnetic actuators electrically coupled to a second AMB having a second group of electromagnetic actuators; and a controller including a three-phase controlling circuit having a plurality of active current switches for controlling each of the first AMB and the second AMB; wherein a first electromagnetic actuator of the first AMB is electrically coupled to a second electromagnetic actuator of the second AMB, each of the first and second electromagnetic actuators coupled to two phase legs of the controlling circuit; and wherein the controller is operable to receive information indicative of a position of the rotor shaft and supply an adjustment signal to the magnetic bearing system to adjust the position of the rotor shaft.

According to another aspect of the invention, a magnetic bearing system includes a first active magnetic bearing (AMB) including a first group of electromagnetic actuators coupled to a shaft; a second active magnetic bearing (AMB) including a second group of electromagnetic actuators coupled to the shaft; a controller including a three-phase controlling circuit having a plurality of active current switches for controlling each of the first AMB and the second AMB; wherein a first electromagnetic actuator of the first AMB is electrically coupled to a second electromagnetic actuator of the second AMB, each of the first and second electromagnetic actuators coupled to two phase legs of the controlling circuit; and wherein the controller is operable to receive information indicative of a position of the rotor shaft and supply an adjustment signal to the magnetic bearing system to adjust the position of the shaft.

According to another aspect of the invention, a method for controlling a rotor shaft that operatively connects a compressor to a motor in a vapor compression system, includes receiving information indicative of a first position of a first active magnetic bearing (AMB), the first AMB includes a first group of electromagnetic actuators being coupled to the rotor shaft at the first position; receiving information indicative of a second position of a second AMB, the second AMB includes a second group of electromagnetic actuators being coupled to the rotor shaft at the second position; and providing a controller in electrical communication with each of the first AMB and the second AMB; and the controller generating a signal to position the rotor shaft at least one of the first position or the second position; wherein the controller includes a three-phase controlling circuit having a plurality of active current switches for controlling each of the first AMB and the second AMB; and wherein a first electromagnetic actuator of the first AMB is electrically coupled to a second electromagnetic actuator of the second AMB, each of the first and second electromagnetic actuators coupled to two phase legs of the controlling circuit.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the figures:

FIG. 2 depicts a schematic perspective of a rotor shaft coupled to the magnetic bearing system according to an embodiment of the invention;

FIG. 3 depicts a schematic view of a methodology to couple the AMBs to a rotor shaft according to an embodiment of the invention;

FIG. 4A depicts a circuit topology for connecting current switches to the magnetic bearing system according to an embodiment of the invention;

DETAILED DESCRIPTION

Embodiments include a vapor compression-type HVAC system that includes a multiple-axis AMB for supporting a rotor shaft. The rotor shaft connects a compressor to a motor and is constrained by the AMB, which receives one or more energizing signals to adjust the radial position of the rotor shaft. In an exemplary embodiment, the AMB may include a reduced switch multi-phase circuit topology with unidirectional active current switches. This exemplary embodiment with the multi-phase circuit topology reduces the number of diodes and switches that are used to constrain the radial position of the rotor shaft. The HVAC system also includes a controller having a processor for implementing a control algorithm for controlling the bias current used to control the coils in the AMB in order to adjust the position of the rotor shaft.

Figure 1:
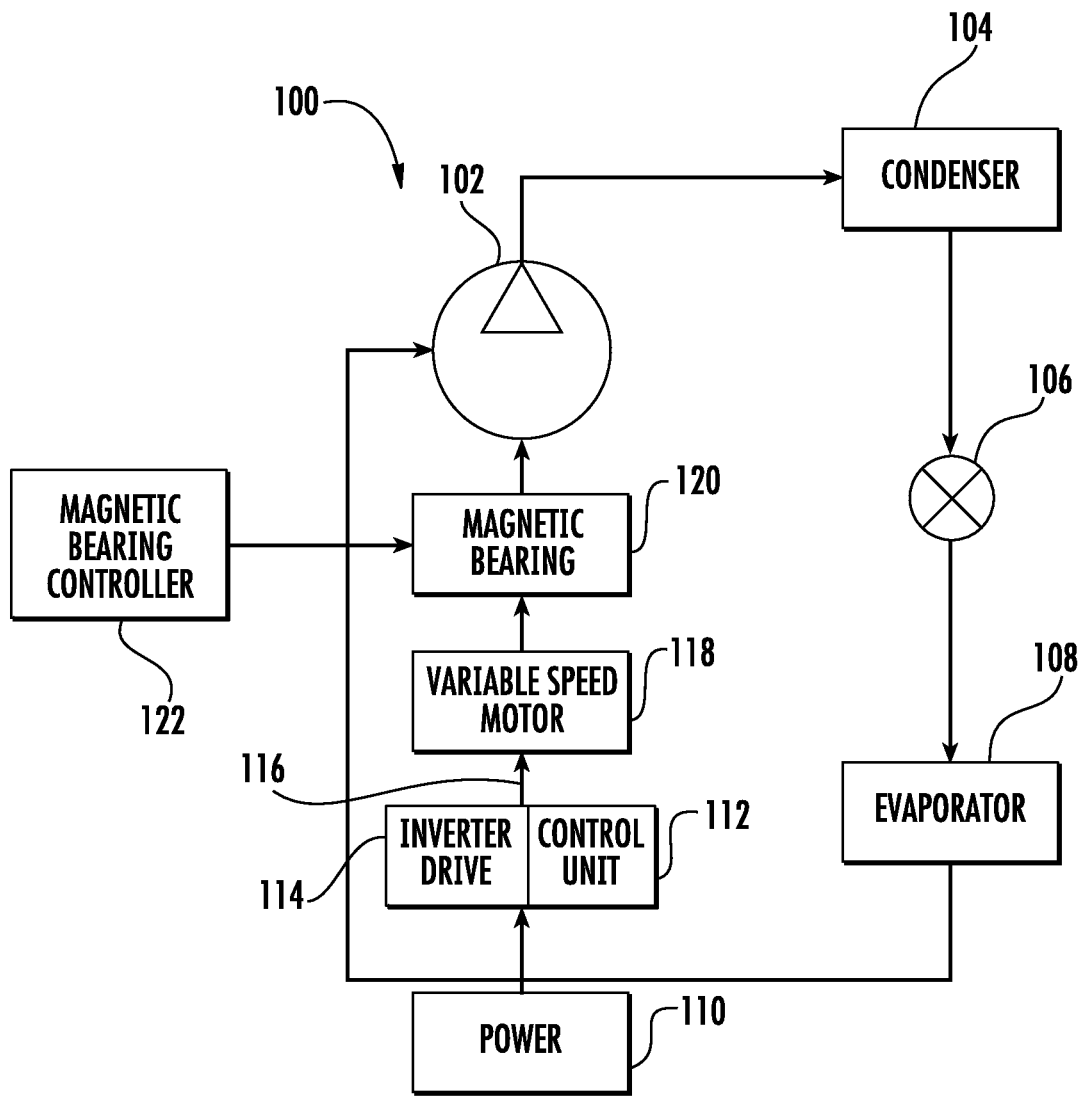
FIG. 1 depicts a schematic view of a refrigerant vapor compression system including a magnetic bearing system according to an embodiment of the invention.

Referring now to the drawings, FIG. 1 illustrates an exemplary refrigerant vapor compression system 100 including a variable speed motor 118 having a rotor shaft 206 (FIG. 2) that is coupled to a compressor 102 according to an embodiment of the invention. The rotor shaft is supported by a magnetic bearing system 120, which includes a plurality of AMBs 202, 204 (shown in FIG. 2). The compressor 102 includes an impeller/rotor that rotates and compresses liquid refrigerant to a superheated refrigerant vapor for delivery to a condenser 104. In the condenser 104, the refrigerant vapor is liquefied at high pressure and rejects heat to the outside air (e.g., via a condenser fan). The liquid refrigerant exiting condenser 104 is delivered to an evaporator 108 through an expansion valve 106. The refrigerant passes through the expansion valve 106 where a pressure drop causes the high-pressure liquid refrigerant to achieve a lower pressure combination of liquid and vapor. In embodiments, the expansion valve 106 may be a thermostatic expansion valve or an electronic expansion valve for controlling superheat of the refrigerant. As the indoor air passes across the evaporator 108 (e.g., via an evaporator fan), the low-pressure liquid refrigerant evaporates, absorbing heat from the indoor air, thereby cooling the air and evaporating the refrigerant. The low-pressure refrigerant is again delivered to compressor 102 where it is compressed to a high-pressure, high temperature gas, and delivered to condenser 104 to start the refrigeration cycle again. It is to be appreciated that while a specific refrigeration system is shown in FIG. 1, the present teachings are applicable to any refrigeration system, including a heat pump, HVAC, and chiller systems. In a heat pump, during cooling mode, the process is identical to that as described hereinabove. In the heating mode, the cycle is reversed with the condenser and evaporator of the cooling mode acting as an evaporator and condenser, respectively.

Also shown in FIG. 1, vapor compression system 100 includes a compressor 102 driven by a variable speed motor 118 through an inverter drive 114. In embodiments, the inverter drive 114 may be a variable frequency drive (VFD) or a brushless DC motor (BLDC) drive. Particularly, inverter drive 114 is operably coupled to the compressor 102, and receives an alternating current (AC) electrical power (for example, a three-phase AC line power at 480V/60 Hz) from a power supply 110 and outputs electrical power on line 116 to a variable speed motor 118. The variable speed motor 118 shares a common shaft with the compressor 102. The variable speed motor 118 provides mechanical power to rotate the shaft and compress refrigerant inside the compressor 102. The rotor shaft is constrained by a magnetic bearing system 120, which includes a plurality of AMBs 202, 204 (shown in FIG. 2) for holding the rotor shaft in position. The rotor shaft is radially constrained by a levitated magnetic cushion generated by the magnetic bearing system 120. Since the rotor shaft levitates, there is no structure-borne vibration as the air buffer created by the magnetic bearing system 120 prevents the motor 118 from transmitting vibrations to the system 100. In an embodiment, the magnetic bearing system 120 may include position sensors for detecting the radial position of the magnetically supported rotor shaft along a plurality of radial directions of the rotor shaft. The magnetic bearing system 120 includes a magnetic bearing controller 122 that receives information indicative of the position of the rotor shaft and rotor speed and supplies an adjustment signal to adjust its position via the AMBs 202, 204 (FIG. 2). The magnetic bearing controller 122 includes a processor for implementing an algorithm for controlling one or more active current switches needed for adjusting the position of the rotor shaft. The switches selectively produce a magnetic bias current for excitation of the coils in each AMB 202, 204 of the magnetic bearing system 120. The excitation of the coils adjusts the radial position of the rotor shaft in the x and y directions (FIG. 2) based on an actual value of the position of the rotor shaft, detected by position sensors, in the x and y directions. It is to be appreciated that the magnetic bearing system 120 may also be utilized with other rotating machines utilizing a rotor shaft without departing from the scope of the invention. In an embodiment, the variable speed motor 118 may be integrated inside a housing containing the compressor 102.

Inverter drive 114 includes solid-state electronics to modulate the frequency of electrical power on line 116. In an embodiment, inverter drive 114 converts the AC electrical power, received from supply 110, from AC to direct current (DC) using a rectifier, and then converts the electrical power from DC to a pulse width modulated (PWM) signal, using an inverter, at a desired PWM frequency in order to drive the motor 118 at a motor speed associated with the PWM DC frequency. For example, inverter drive 114 may directly rectify electrical power with a full-wave rectifier bridge, and may then chop the electrical power using insulated gate bipolar transistors (IGBT's) or thyristors to achieve the desired PWM frequency. In embodiments, other suitable electronic components may be used to modulate the frequency of electrical power from power supply 110. Further, a control unit 112 includes a processor for executing an algorithm to control the PWM frequency that is delivered on line 116 to the motor 118. By modulating the PWM frequency of the electrical power delivered on line 116 to the electric motor 118, control unit 112 thereby controls the torque applied by motor 118 on centrifugal compressor 102 thereby controlling its speed, and consequently the capacity of compressor 102.

FIGS. 2-3 depict an exemplary magnetic bearing system 120 having four axes for supporting a rotor shaft 206 (FIG. 2) according to an embodiment of the invention. In other non-limiting embodiments, a multiple axis magnetic bearing system may also be used without departing from the scope of the invention. In the example shown in FIGS. 2-3, the rotor shaft 206 (FIG. 2) passes through the stator of AMBs 202, 204, which apply deflection forces across the x and y axes in order to adjust the position of the rotor shaft 206. Also shown, one of two radial control axes, which are perpendicular to each other, is set to be an x axis and the other is set to be a y axis. Particularly shown in FIG. 2, the magnetic bearing system 120 includes a rotor shaft 206 being supported by a first active magnetic bearing 202 (hereinafter "AMB 202") and a second active magnetic bearing 204 (hereinafter "AMB 204"). In an embodiment, each AMB 202, 204 is shown with four electromagnets that provides for a four-axis AMB. But, in another embodiment, a multiple-axis magnetic bearing system may be implemented with the architecture described below without departing from its scope. Each AMB 202, 204 includes coaxially aligned coils arranged on a stator. In the four-axis AMB system 120, the magnetic bearings 202, 204 receive bias currents for energizing the coils in order to exert displacement forces on the rotor shaft 206 along the x and y axes of AMBs 202, 204 (i.e., along a radial direction).

FIG. 3 depicts an AMB 202 having four electromagnetic actuators 306, 310, 314, and 318 that exert forces on rotor shaft 206 (FIG. 2) in the x and y directions respectively, the x and y directions being mutually orthogonal to each other. Each of the actuators 306, 310, 314, 318 includes an electromagnet having two-coil windings on a pole shoe or yoke. The actuators 306, 310, 314, 318 are coupled to a plurality of active current switches for amplifying the current supplied to the coils in the electromagnets. Additionally, the active current switches apply forces to control the displacement of the rotor shaft 206 (FIG. 2) in the x and y directions. Actuators 306, 310, 314, 318 couples two windings together for exerting these forces in the x and y directions. Specifically, actuator 306 is coupled to coil windings at $x_1+$ and $x_2+$, actuator 310 is coupled to coil windings at $y_1+$ and $y_2+$, actuator 314 is coupled to coil windings at $x_1-$ and $x_2-$, and actuator 318 is coupled to coil windings at $y_1-$ and $y_2-$.

Similarly, the second magnetic radial bearing 204 includes four actuators 308, 312, 316, and 320 for exerting forces in the x and y directions respectively, the x and y directions being mutually orthogonal to each other. Each of the actuators 308, 312, 316, 320 includes an electromagnet having windings on a pole shoe or yoke, with actuators 308, 312, 316, 320 coupled to active current switches for exerting the displacement forces in the x and y directions. Specifically, actuator 308 is coupled to coil windings at $x_3+$ and $x_4+$, actuator 312 is coupled to coil windings at $y_3+$ and $y_4+$, actuator 316 is coupled to coil windings at $x_3-$ and $x_4-$, and actuator 320 is coupled to coil windings at $y_3-$ and $y_4-$. In an embodiment, the actuators 306-320 are reluctance-type actuators that receive a bias current from the active current switches for energizing the electromagnets in the actuators 306-320, which cause a displacement in the x and y directions. Further, the coils in AMB 202 are coupled to opposite coils in AMB 204 through, in one non-limiting example, a reduced switch multi-phase phase circuit topology. Particularly, the coils in actuator 306 are coupled to coils in actuator 316, coils in actuator 310 are coupled to coils in an actuator 320, coils in actuator 314 are coupled to coils in actuator 308, and coils in actuator 318 are coupled to coils in actuator 312, as is shown and described with reference to FIG. 4. It is to be appreciated that the coupling of AMBs 202 with AMB 204 provides additional degrees of freedom to the control scheme required for the magnetic bearing system 120 whereby actuators coupled together are energized at the same time with a common control command and deenergized at the same time with a different but common control command.

FIG. 4A depicts a reduced switch multi-phase circuit topology 400 used for controlling the coils in AMBs 202, 204 (FIGS. 2-3) according to an embodiment of the invention. In an embodiment, the multi-phase circuit topology 400 may be implemented in the controller 122. The circuit topology 400 includes active current switches 402, 404, 406 that couple coils in actuator 306 to coils in actuator 316. Similarly, active current switches 428, 430, 432 couple coils in actuator 310 to coils in actuator 320, switches 434, 436, 438 couple coils in actuator 314 to coils in actuator 308, and active current switches 440, 442, 444 couple coils in actuator 312 to coils in actuator 318. The active current switches 402-406, 428-432, 434-438, and 440-444 create a reluctance-type actuator that supplies the bias currents to the magnetic bearing system 120. In an embodiment, the active current switches 402-406, 428-432, 434-438, and 440-444 are IGBTs, although MOSFETs, or other similar types of high-voltage power amplifiers may be utilized in other embodiments. In a non-limiting example shown implemented for phases 418, 420, 422, the reduced switch topology 400 includes three high-voltage bi-directional active current switches 402, 404, and 406 and three diodes 412, 414, and 416 that are connected to one of three phases 418, 420, and 422. Specifically, an active current switch 402 and a diode 412 are connected in series in a first phase 418 to a positive DC voltage rail 424 and DC ground 426. The diode 412 is inserted with its anode connected to DC ground 426 (i.e., diode 412 is in its conduction direction). Similarly, an active current switch 404 and a diode 414 are connected in series in a second phase 420 to the positive DC voltage rail 424 and DC ground 426 with the diode 414 inserted opposite to the direction of diode 412, and an active current switch 406 and a diode 416 are connected in series in a third phase 422 to the positive DC voltage rail 424 and DC ground 426 with the diode 416 inserted in the same direction as diode 412 (i.e., in the direction of positive current). The design 400 also includes actuator 306 connected to phase 418 and phase 420, and actuator 316 connected to phase 420 and phase 422. In electrical terms, the actuators 306, 316 may be represented essentially by a large inductance. Also, the active current switches 402, 404, 406 are driven by means of modulation techniques like pulse-width modulation (PWM) in order to produce gating pulses to periodically turn ON and OFF active current switches 402, 404, 406 and control the time averaged current through each switch 420, 404, 406.

Similarly, active current switches 428, 430, 432 couples coils in actuator 310 to coils in actuator 320 with diodes 452, 454, 456 along phases 446, 448, 450; switches 434, 436, 438 couples coils in actuator 314 to coils in actuator 308 with diodes 464, 466, 468 along phases 458, 460, 462; and active current switches 440, 442, 444 couples coils in actuator 312 to coils in actuator 318 with diodes 476, 478, 480 along phases 470, 474, 476.

In an embodiment, controlling the magnetic bearing system 120 by turning ON the switches such as, for example active current switch 402 energizes the actuator 306 by causing a current to flow through the active current switch 402 and into the actuator 306. It is to be appreciated that the control scheme for controlling active current switches 402-406, 428-432, 434-438, and 440-444 may be employed through a PWM technique, which turn the active current switches 402-406, 428-432, 434-438, and 440-444 ON and OFF at about 10 KHz to about 20 KHz, which is a smaller time constant than the mechanical time constant of the system 100.

An exemplary operation, with reference to FIG. 4A, for energizing and deenergizing actuators 306, 316 coupled to phases 418, 420, 422 in order to exert radial deflection forces in the x and y directions is described below. Initially, all three active current switches 402, 404, 406 are OFF. In a first cycle, coils connected to $x_1+$ and $x_2+$ (i.e., actuator 306) are energized in order to deflect the shaft 206 (FIG. 2) in the $x_1+$ and $x_2+$ directions. In order to energize actuator 306, active current switches 402, 404 are turned ON at the same time while active current switch 406 is OFF. In this state, current flows from positive DC voltage rail 424 into active current switch 402 of phase 418, into actuator 306, into active current switch 404 of phase 420, and into DC ground 426. The actuator 306 acts as a large inductance, i.e., current will gradually build up in the actuator 306. Once the desired bias current is reached, active current switch 402 is turned OFF in order to deenergize the coils in actuator 306 and control the deflection in both $x_1+$ and $x_2+$ directions. The current now flows in a closed loop through the remaining closed active current switch 404, actuator 306, and diode 412. The current may be increased by turning ON both active current switches 402, 404 or decreased by turning OFF active current switch 402 in order to regulate the current in the actuator 306 and exert a deflection force in $x_1+$ and $x_2+$. Similarly, current in actuator 316 may also be controlled. To energize the coils connected to $x_3-$ and $x_4-$ in a first cycle, active current switches 406, 404 are turned ON, at the same time, while active current switch 402 is OFF. In this state, current flows from positive DC voltage rail 424 into active current switch 406 of phase 422, into $x_4-$ and $x_3-$ (i.e., actuator 316), into active current switch 404 of phase 420, and into DC ground 426. The actuator 316 acts as a large inductance, i.e., current will gradually build up in the actuator 316. Once the desired bias current is reached, active current switch 406 is turned OFF in order to deenergize the coils in actuator 316. The current now flows in a closed loop through the remaining closed active switch 404, diode 416, and actuator 316. The current may be increased by turning ON both active current switches 406, 404 or decreased by turning OFF active current switch 406 in order to regulate the current in the actuator 316. Similarly, in other embodiments, actuators 310, 320 may be controlled using the methodology described above using active current switches 428, 430, 432 and diodes 452, 454, 456; actuators 314, 308 may be controlled using active current switches 434, 436, 438 and diodes 464, 466, 468; and actuators 312, 318 may be controlled using active current switches 440, 442, 444, and diodes 476, 478, 480. The turn ON and turn OFF events happen at switching frequencies of around 20 KHz to regulate the current in the coils.

Figure 4B:
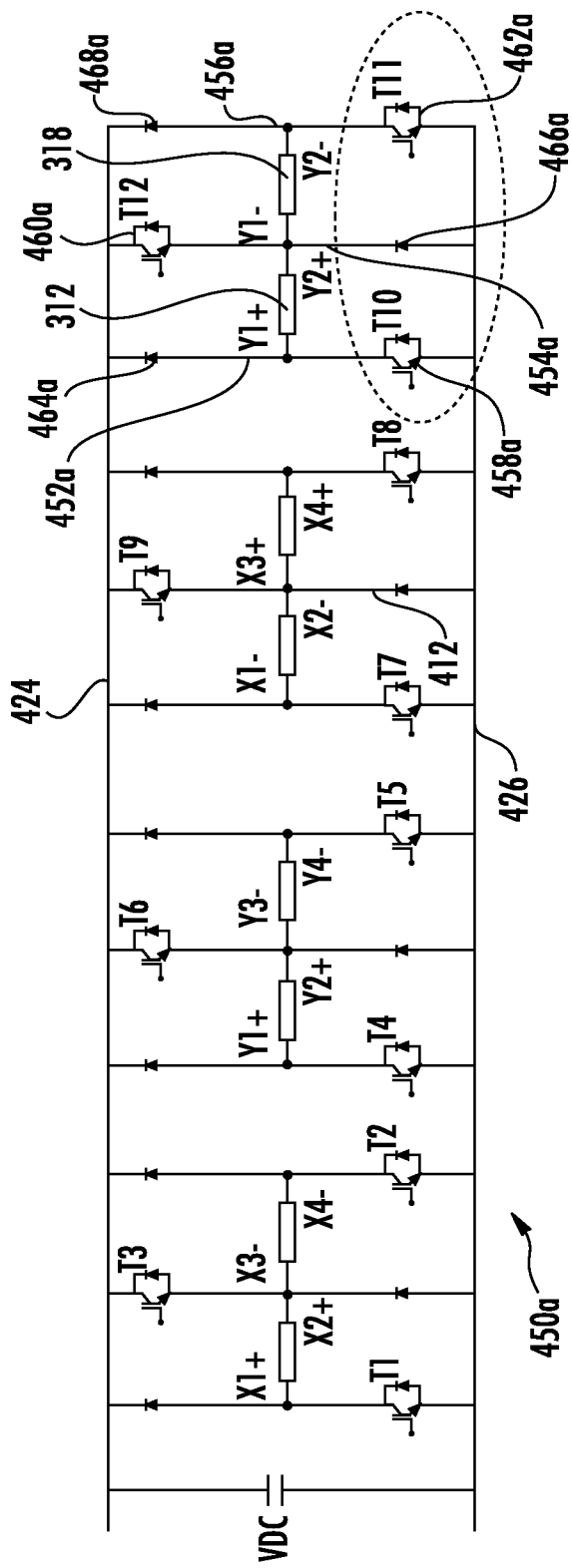
FIG. 4B depicts an alternate circuit topology for connecting current switches to the magnetic bearing system according to an embodiment of the invention.

FIG. 4B depicts an alternate embodiment of a reduced switch multi-phase circuit topology 450 used for controlling the coils in AMBs 202, 204 (FIGS. 2-3) while all other aspects remain substantially the same as those described with reference to FIG. 4A. In one non-limiting described example for phases 452a, 454a, 456a, the circuit topology 450 includes respective active current switches 458a, 460a, 462a. The active current switches 458a, 460a, 462a couples coils in actuator 312 to coils in actuator 318. Also, the reduced switch topology 450a includes three diodes 464a, 466a, 468a that are connected to one of three phases 452a, 454a, and 456a, respectively. As shown, the two active current switches 458a, 462a are electrically coupled directly to DC ground 426 and active current switch 460a is coupled directly to the positive DC voltage rail 424. Similar to the embodiment shown as described with reference to FIG. 4A, the active current switches 458a, 460a, 462a are driven by means of modulation techniques like pulse-width modulation (PWM) in order to produce gating pulses to periodically turn ON and OFF active current switches 458a, 460a, 462a and control the time averaged current through each switch 458a, 460a, 462a.

Figure 5:
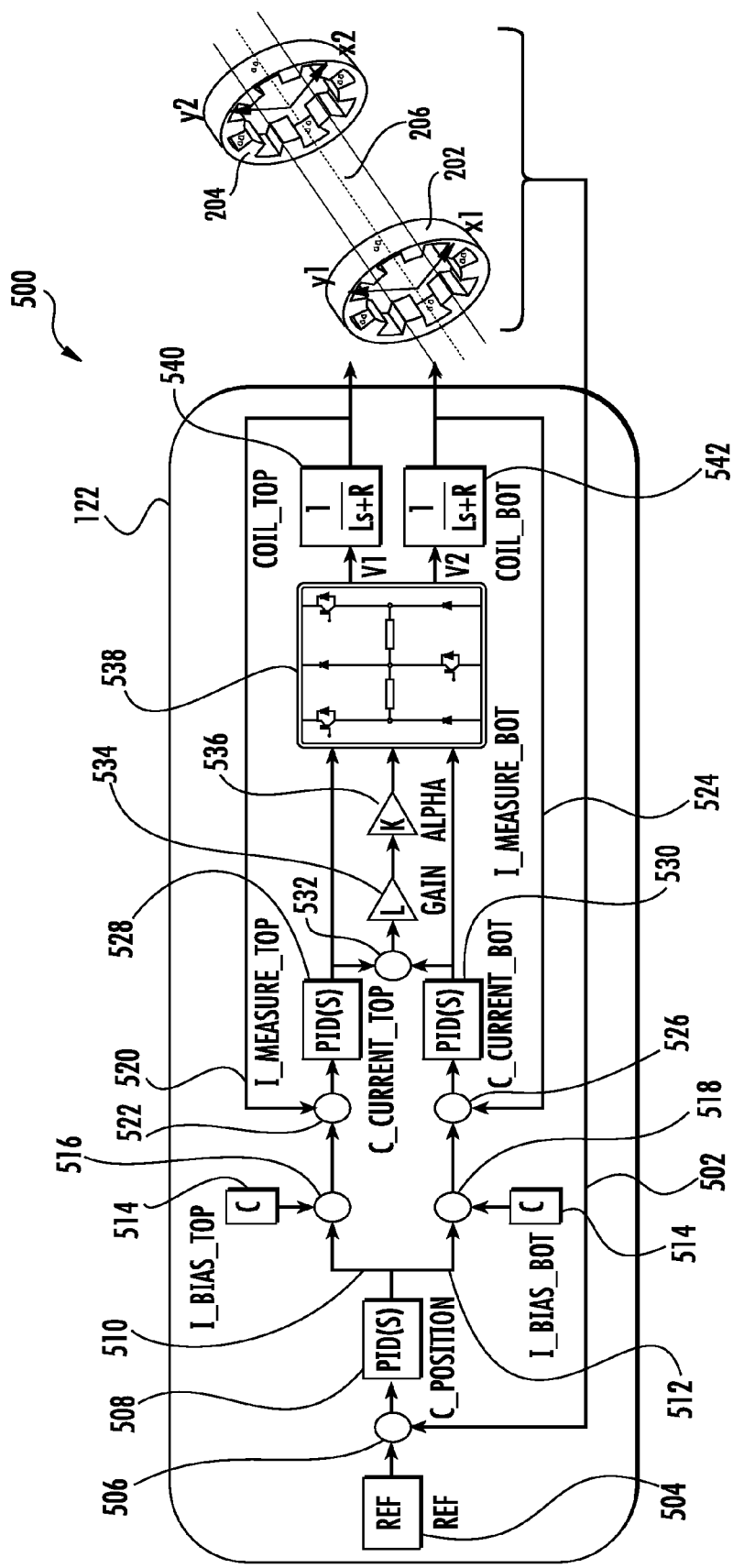
FIG. 5 depicts a schematic diagram of a control algorithm for controlling the magnetic bearing system according to an embodiment of the invention.

FIG. 5 illustrates a schematic of a control algorithm 500 implemented by the magnetic bearing controller 122 for controlling the magnetic bearing system 120 (FIG. 2) according to an embodiment of the invention. The magnetic bearing controller 122 implements an algorithm 500 that adaptively controls the excitation currents in order to energize the actuators 306-320 (FIG. 3) in its active region and avoid "negative currents". The controller 122 includes a preprogrammed microprocessor for executing instructions stored in a computer readable medium. In an embodiment, the computer readable medium may be a ROM, an EPROM or other suitable data storage device. The excitation current includes a bias current and a control current. For ease of explanation, the active current injection methodology will be described with reference to the reduced switch multi-phase topology 400 for controlling the energizing current in the actuators 306, 316 (FIG. 4A). It is to be appreciated that while aspects of the control algorithm is described with reference to a circuit, the algorithm 500 may be implement by software of a microprocessor to provide controlling signals for the magnetic bearing system 120.

In an embodiment, output voltage signals are received on line 502 from position sensors (not shown) coupled to the AMBs 202, 204. The voltage signals represent the real position of the rotor 206 along x1+, x2+, x3−, and x4− directions. The voltage signals are filtered by system 500 and sent to a comparator 504. The comparator 506 compares the filtered voltage signal with a position reference value 504 to produce an error value to be applied to a control circuit. In one non-limiting embodiment, a proportional integral differential (PID) circuit 508 may be used, but other similar circuits may also be utilized. The output of the PID circuit 508 is a control current that is supplied to circuit paths 510, 512. Circuit path 510 represents the path for controlling switch 402 in phase 418 (FIG. 4A) while circuit path represents the path for controlling switch 406 in phase 422 (FIG. 4A). The control current from PID 508 is added to a bias current value 514 in an adder circuit 516 while the control current from PID 508 is subtracted from the bias current value 514 in a subtracter circuit 518. The output value from the adder 516 is compared with a feedback current 520 in comparator 522 while the output value from the subtracter circuit 518 is compared with the feedback current 524 in comparator circuit 526. Feedback currents 520, 524 represent the total scaled current that passes through respective phases 418, 422 (FIG. 4A), which includes the bias current and the control current. The error signal from comparator 522 is sent to a PID 528 while the error signal from the comparator 526 is sent to a PID 530. The PID's 528, 530 output control voltages that control the respective switches 402, 406 in respective phases 418, 422 (FIG. 4A) for exciting the actuators 306, 316 (FIG. 4A). Additionally, the output voltages from PID's 528, 530 are sent to a comparator circuit 532, which determines a scaling factor α to be applied to the output voltages from PID's 528, 530. The scaling factor α enables a full coupling between the actuators 306, 316 (FIG. 4A) and increases the bandwidth of the magnetic bearing system 120. The comparator circuit 532 sends its output to a gain amplifier 534 and to a second attenuator 536, which determines the current values in phases 418, 420, 422 (FIG. 4A) and a scaling factor α according to the expression (1):

$$b = -\alpha(S) * (a+c) \tag{1}$$

where:
α(S)=scaling factor;
b=current in phase 420 (FIG. 4A);

a=current in phase 418 (FIG. 4A);
c=current in phase 422 (FIG. 4A); and
0<α(S)<1.

Upon receiving the output voltages from PID's 528, 530 and the scaling factor α(S) from attenuator 536, the three-phase current controller 538 controls the corresponding currents in phases 418, 420, 422 by outputting control voltages 540, 542 having transfer functions v1(s), v2(s), respectively. The control voltages 540, 542 control the respective actuators 306, 316 (FIG. 4A) according to the expressions (2) and (3) for the transfer functions v1(s), v2(s):

$$v1(s) = \frac{(R+Ls)C_{current}(s)[(1+2\alpha(S))I_{bias}+i]}{R+Ls+1+2\alpha(S)}; \tag{2}$$

$$v2(s) = \frac{(R+Ls)C_{current}(s)[(1+2\alpha(S))I_{bias}-i]}{R+Ls+1+2\alpha(S)}. \tag{3}$$

Figure 6:
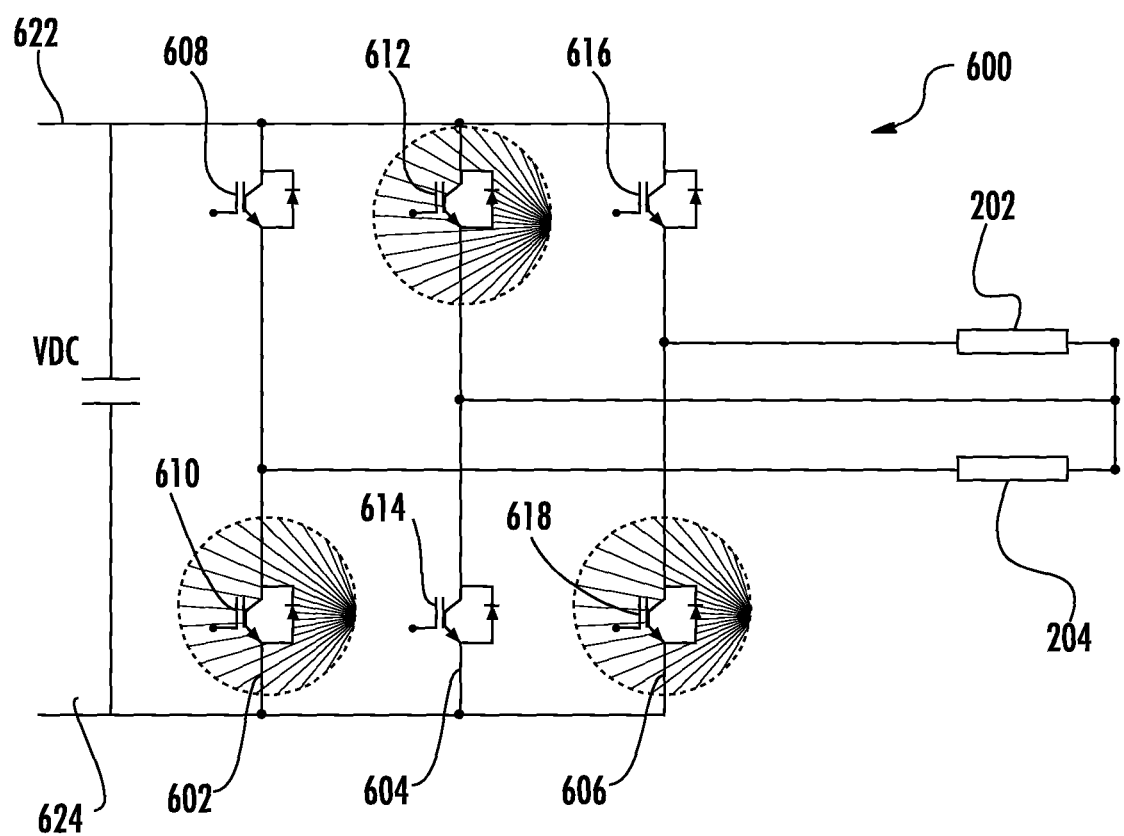
FIG. 6 depicts a two-level six-switch circuit topology according to an embodiment of the invention.

FIG. 6 depicts an alternate embodiment of a reduced switch multi-phase circuit topology 600 used for controlling the coils in AMBs 202, 204 with the algorithm 500 that was discussed with reference to FIG. 5. In one non-limiting described example for phases 602, the circuit topology 600 includes respective active current switches 608, 610 connected in series to positive DC rail 622 and ground 624. Similarly, switches 612, 614 are connected in series to phase 604; and switches 616, 618 are connected in series to phase 606. The active current switches 608, 610, 612, 614 are coupled to actuator 202 while active current switches 612, 614, 616, 618 are coupled to actuator 204. Similar to the embodiment shown as described with reference to FIG. 4A, the active current switches 608-618 are driven by means of modulation techniques like pulse-width modulation (PWM) in order to produce gating pulses to periodically turn ON and OFF active current switches 608-618 and control the time averaged current through each switch 608-618. It is also to be appreciated that the reduced switch multi-phase circuit topology 600 requires a reduced number of active switches over the H-bridge circuit topologies in order to control the magnetic bearing system 120 (FIG. 2) while also optimizing bearing stiffness, and preventing negative currents in the magnetic bearing system 120.

The technical effects and benefits of exemplary embodiments include a vapor compression-type HVAC system that utilizes a multiple-axis magnetic bearing system for supporting a shaft connecting a compressor with a motor. The multiple-axis magnetic bearing system may include a reduced switch multi-phase circuit design with unidirectional active current switches and diodes in order to reduce the number of diodes and switches being used. Also, a control algorithm is provided for implementation by a controller for controlling the bias current used to control the coils in actuators for the magnetic bearing system.

The terminology used herein is for the purpose of describing particular embodiments only and is not intended to be limiting of the invention. While the description of the present invention has been presented for purposes of illustration and description, it is not intended to be exhaustive or limited to the embodiments disclosed. Exemplary embodiments are described with reference to a compressor and a vapor compression system, but embodiments of the invention should not be considered as limited to such. Many modifications, variations, alterations, substitutions, or equivalent arrangement not hereto described will be apparent to those of ordinary skill in the art without departing from the scope and spirit of the invention. Additionally, while the various embodiments of the invention have been described with reference to a compressor and a vapor compression system, it is to be understood that aspects of the invention should not be considered to be limited to such a reference. Accordingly, the invention is not to be seen as defined by the foregoing description, but is set forth by the scope of the appended claims.

The invention claimed is:

1. A refrigerant vapor compression system including a condenser, an expansion valve, an evaporator, and a compressor coupled to a multiple-axis magnetic bearing system, comprising:
a motor operatively coupled to the compressor via a rotor shaft;
a position sensor to generate information indicative of a position of the rotor shaft;
the multiple-axis magnetic bearing system including a first active magnetic bearing (AMB) having a first group of electromagnetic actuators electrically coupled to a second AMB having a second group of electromagnetic actuators; and
a controller including a three-phase controlling circuit having a plurality of active current switches for controlling each of the first AMB and the second AMB;
wherein a first electromagnetic actuator of the first AMB is electrically coupled to a second electromagnetic actuator of the second AMB at a first phase leg, the first electromagnetic actuator coupled to a second phase leg and the second electromagnetic actuator coupled to a third phase leg of the controlling circuit;
wherein a third electromagnetic actuator of the first AMB is electrically coupled to a fourth electromagnetic actuator of the second AMB at a fourth phase leg, the third electromagnetic actuator coupled to a fifth phase leg and the fourth electromagnetic actuator coupled to a sixth phase leg of the controlling circuit; and
wherein the controller is operable to receive the information indicative of the position of the rotor shaft and supply an adjustment signal to the magnetic bearing system to adjust the position of the rotor shaft;
wherein the first group of electromagnetic actuators controls a position of the rotor shaft at a first location along a longitudinal length of the rotor shaft and the second group of electromagnetic actuators controls a position of the rotor shaft at a second location along the longitudinal length of the rotor shaft, the second position different from the first location.

2. The system of claim 1, wherein the three-phase controlling circuit includes an active current switch coupled to at least one electromagnetic actuator from one of the first group of electromagnetic actuators or the second group of electromagnetic actuators.

3. The system of claim 1, wherein the three-phase controlling circuit includes an active current switch electrically coupled in series to a diode and an electromagnetic actuator on a phase leg.

4. The system of claim 1, wherein the three-phase controlling circuit includes two active current switches electrically coupled in series and an electromagnetic actuator on a phase leg.

5. The system of claim 1, further comprising an active current switch receiving an exciting current for energizing the at least one electromagnetic actuator.

6. The system of claim 1, further comprising an active current switch electrically connected a positive DC voltage level, a diode, and an electromagnetic actuator from the first group of electromagnetic actuators.

7. The system of claim 1, wherein the controller is configured for energizing at least one electromagnetic actuator from one of the first group of electromagnetic actuators or the second group of electromagnetic actuators.

8. The system of claim 1, wherein the controller is configured for controlling a bias current that is applied to at least one electromagnetic actuator of the first group of electromagnetic actuators or the second group of electromagnetic actuators.

9. The system of claim 8, wherein the controller is configured for scaling the bias current.

10. A magnetic bearing system comprising:
a first active magnetic bearing (AMB) including a first group of electromagnetic actuators coupled to a shaft;
a second active magnetic bearing (AMB) including a second group of electromagnetic actuators coupled to the shaft;
a position sensor to generate information indicative of a position of the rotor shaft;
a controller including a three-phase controlling circuit having a plurality of active current switches for controlling each of the first AMB and the second AMB;
wherein a first electromagnetic actuator of the first AMB is electrically coupled to a second electromagnetic actuator of the second AMB at a first phase leg, the first electromagnetic actuator coupled to a second phase leg and the second electromagnetic actuator coupled to a third phase leg of the controlling circuit;
wherein a third electromagnetic actuator of the first AMB is electrically coupled to a fourth electromagnetic actuator of the second AMB at a fourth phase leg, the third electromagnetic actuator coupled to a fifth phase leg and the fourth electromagnetic actuator coupled to a sixth phase leg of the controlling circuit; and
wherein the controller is operable to receive the information indicative of the position of the rotor shaft and supply an adjustment signal to the magnetic bearing system to adjust the position of the shaft;
wherein the first group of electromagnetic actuators controls a position of the rotor shaft at a first location along a longitudinal length of the rotor shaft and the second group of electromagnetic actuators controls a position of the rotor shaft at a second location along the longitudinal length of the rotor shaft, the second location different from the first location.

11. The system of claim 10, wherein the three-phase controlling circuit includes an active current switch coupled to at least one electromagnetic actuator from one of the first group of electromagnetic actuators or the second group of electromagnetic actuators.

12. The system of claim 10, wherein the three-phase controlling circuit includes an active current switch electrically coupled in series to a diode and an electromagnetic actuator on a phase leg.

13. The system of claim 10, wherein the three-phase controlling circuit includes two active current switches electrically coupled in series and an electromagnetic actuator on a phase leg.

14. The system of claim 10, further comprising an active current switch receiving an exciting current for energizing the at least one electromagnetic actuator.

15. The system of claim 10, further comprising an active current switch electrically connected a positive DC voltage level, a diode, and an electromagnetic actuator from the first group.

16. The system of claim 10, wherein the controller is configured for energizing at least one electromagnetic actuator from one of the first group of electromagnetic actuators or the second group of electromagnetic actuators.

17. The system of claim 10, wherein the controller is configured for controlling a bias current that is applied to at least one electromagnetic actuator of the first group of electromagnetic actuators or the second group of electromagnetic actuators.

18. The system of claim 17, wherein the controller is configured for scaling the bias current.

19. A method for controlling a rotor shaft that operatively connects a compressor to a motor in a vapor compression system, comprising:
receiving information indicative of a first position of a first active magnetic bearing (AMB), the first AMB includes a first group of electromagnetic actuators being coupled to the rotor shaft at the first position;
receiving information indicative of a second position of a second AMB, the second AMB includes a second group of electromagnetic actuators being coupled to the rotor shaft at the second position; and
providing a controller in electrical communication with each of the first AMB and the second AMB; and
the controller generating a signal to position the rotor shaft at at least one of the first position or the second position;
wherein the controller includes a three-phase controlling circuit having a plurality of active current switches for controlling each of the first AMB and the second AMB; and
wherein a first electromagnetic actuator of the first AMB is electrically coupled to a second electromagnetic actuator of the second AMB at a first phase leg, the first electromagnetic actuator coupled to a third phase leg and the second electromagnetic actuator coupled to a third phase leg of the controlling circuit;
wherein a third electromagnetic actuator of the first AMB is electrically coupled to a fourth electromagnetic actuator of the second AMB at a fourth phase leg, the third electromagnetic actuator coupled to a fifth phase leg and the fourth electromagnetic actuator coupled to a sixth phase leg of the controlling circuit;
the method including controlling with the first group of electromagnetic actuators a radial position of the rotor shaft at a first location along a longitudinal length of the rotor shaft and controlling with the second group of electromagnetic actuators a radial position of the rotor shaft at a second location along the longitudinal length of the rotor shaft, the second location different from the first location.

20. The method of claim 19, wherein providing the controller further comprises providing a three-phase controlling circuit including an active current switch coupled to at least one electromagnetic actuator from one of the first group of electromagnetic actuators or the second group of electromagnetic actuators.

21. The method of claim 19, wherein providing the controller further comprises providing a three-phase controlling circuit including an active current switch electrically coupled in series to a diode and an electromagnetic actuator on a phase leg.

22. The method of claim 19, wherein providing the controller further comprises providing a three-phase controlling circuit having two active current switches electrically coupled in series and an electromagnetic actuator on a phase leg.

23. The method of claim 22, wherein providing the controlling circuit further comprises providing an active current switch configured for receiving an exciting current for energizing the at least one electromagnetic actuator.

24. The method of claim 22, wherein providing the controlling circuit further comprises providing an active current switch electrically connected a positive DC voltage level, a diode, and an electromagnetic actuator from the first group.

25. The method of claim 19, wherein the controller generating the signal comprises energizing at least one electromagnetic actuator from one of the first group of electromagnetic actuators or the second group of electromagnetic actuators.

26. The method of claim 19, wherein the controller generating the signal comprises controlling a bias current that is applied to at least one electromagnetic actuator of the first group of electromagnetic actuators or the second group of electromagnetic actuators.

27. The method of claim 26, wherein the controller scales the bias current.

* * * * *